WRIGHT & FOUCHE.
Decomposing Fats.
No. 22,765.
Patented Jan. 25, 1859.
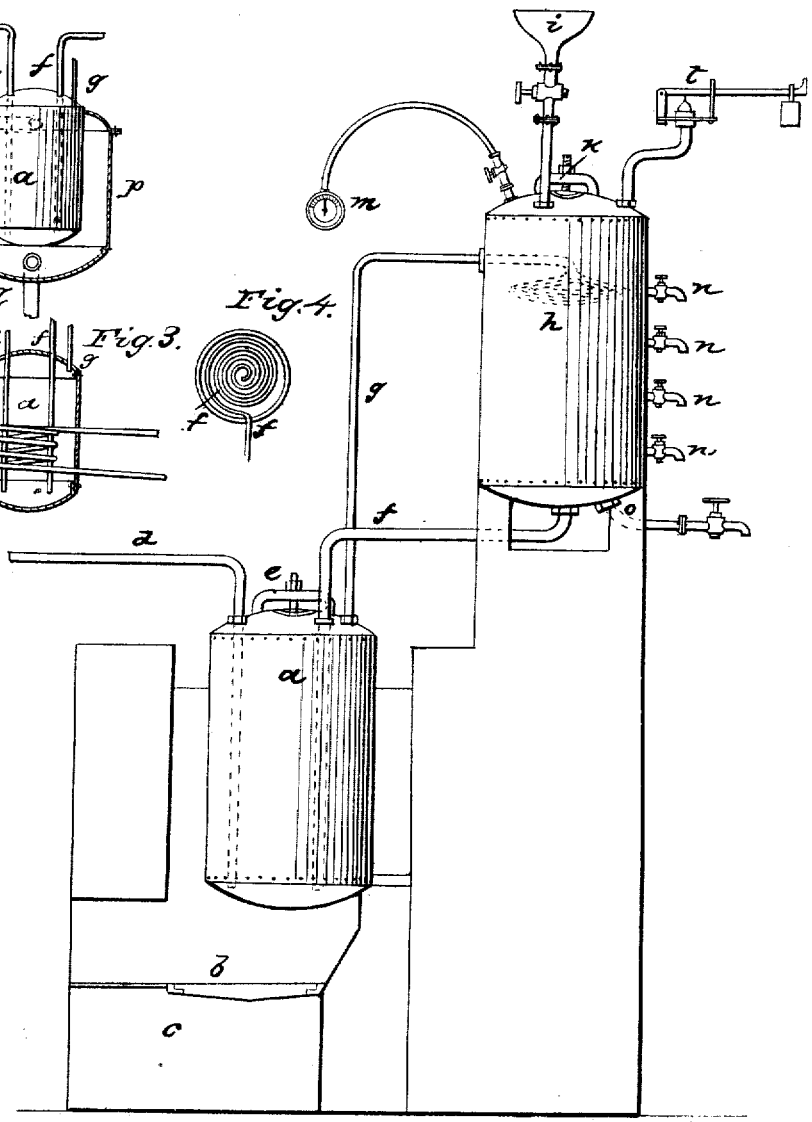

UNITED STATES PATENT OFFICE.

ROBERT A. WRIGHT AND LOUIS J. FOUCHÉ, OF PARIS, FRANCE.

IMPROVEMENT IN PROCESSES FOR DECOMPOSING FATS.

Specification forming part of Letters Patent No. 22,765, dated January 25, 1859.

*To all whom it may concern:*

Be it known that we, ROBERT ALFRED WRIGHT, civil engineer, and LOUIS JULES FOUCHÉ, steam-boiler maker, of Paris, in the Empire of France, have invented a new Apparatus Destined to Produce Chemical Decomposition by Means of Superheated Steam and Water; and we do hereby declare that the following is a full, clear, and exact description of the same, reference being had to the annexed sheet of drawings, making a part of the same.

The apparatus which it is the object of the present patent to secure is susceptible of several industrial applications; but as it is chiefly intended for the decomposition of fatty substances into fatty acids and glycerine we will describe it as applied to that purpose.

This invention is represented in the annexed drawings, wherein—

Figure 1 shows the elevation of the apparatus complete; Fig. 2, the vertical section of a part of the apparatus modified; Fig. 3, the vertical section of a part of the apparatus in a modified form; lastly, Fig. 4, the horizontal section of the same modified apparatus.

The dimensions of the apparatus may vary with the various purposes to which it may be applied. In these figures the same letters indicate the same parts when they recur.

$a$ is a metal (iron or copper) boiler, of any form whatever, placed in a furnace in order to be heated by a naked fire. This boiler has sides sufficiently strong to resist a pressure of from ten to twenty atmospheres. It is of variable capacity, according to the requirements of the manufacture, and it may have its interior lined with lead or by any other metal which will not be attacked by the fatty bodies which are to be introduced and produced therein.

$b$ is the hearth; $c$, ash-pit; $d$, dipping-pipe furnished with a cock to empty the apparatus by pressure; $e$, man-hole serving for cleaning the cylindrical vessel $a$ and for the introduction of substances, if required; $f$, metal tube (of iron or copper) connecting the bottom of the boiler $a$ with the bottom of cylinder $h$; $g$, metal tube of ascension conducting the superheated water from the boiler $a$ to the upper part of cylinder $h$. This tube is terminated in the interior of the cylinder $h$ by a rose-jet, or, more simply, holes are made in the extremity, so as to distribute the water uniformly in the cylinder $h$, and to insure a molecular or finely-subdivided contact between the superheated water and the substance submitted to the operation.

$h$ is an iron or copper upper cylinder, which should, like boiler $a$, be able to resist a pressure of from ten to twenty atmospheres. This cylinder $h$ receives the substances to be treated.

$i$ is a funnel furnished with a tube and with a cock serving for the introduction of the substances to be treated into the cylinder $h$—that is, when this substance is of such a nature as to be introduced through a small aperture; $k$, man-hole serving for cleaning the cylinder $h$, and for the introduction of substances to be treated which cannot pass through the funnel $i$; $l$, safety-valve; $m$, manometer or pressure gage indicating the pressure in the whole of the apparatus; $n\ n$, cocks serving to indicate the height and level of the substance and of the water in cylinder $h$; $o$, cock serving to empty the cylinder when the operation is completed.

*Action of the apparatus.*—Supposing everything arranged as shown in the drawings, then, in order to decompose fatty substances into fatty acids and into glycerine, the boiler $a$ is completely filled with water, the cylinder $h$ is filled with water up to one-third of its height, and it is then filled up to the level of the upper cock with the fatty bodies to be decomposed. The introduction of the fatty bodies takes place, as we have said, either through the funnel $i$ or by the man-hole $k$. The boiler $a$ is then gradually heated till the pressure-gage indicates a pressure of from ten to twenty atmospheres, according to the nature of the substances submitted to the operation, when the following takes place: The superheated water in the boiler $a$ acquires an ascending motion on account of the difference in the temperature of the two capacities $a$ and $h$. A current is thus created, whence it results that the heated water in boiler $a$ ascends through the tube $g$ into the cylinder $h$, and being forcibly driven out through the holes in the rose-jet passes through the fatty bodies and descends again through the tube $f$ to the bottom of the boiler $a$, where it is again warmed, in order to recommence its ascending motion, and so on. When this operation has been thus continued during a length of time which may vary from five to eight hours, according to the nature of the fatty bodies operated on, and also according to the variation of pressure, (varying from ten to twenty atmospheres,) the fatty bodies are decomposed into glycerine, which remains dissolved in the water, and into fatty acids, which float in the cylinder $h$. The contents are now emptied out and separated from each other at the same time.

In Figs. 2, 3, and 4 we have represented modifications of the heating-boiler $a$. Thus in Fig. 2 the boiler is heated by a continuous current of steam. For this purpose, $p$ is a double casing receiving the steam. $r$ and $q$ are the entering and exit pipes. This same apparatus having the double casing may be placed on a furnace with a naked fire, so as to form a water-bath at high temperature. It is furnished with a man-hole and safety-valve. (Not represented in the drawings.) In Fig. 3 the water in the boiler $a$ is heated by a worm, $s$, having one branch leading from any generator whatever and returning to the same generator by the other branch. In Fig. 4 the water in boiler $a$ is heated by a horizontal worm, $t$, having one branch coming from any suitable generator and returning to this same generator by the other branch.

In conclusion, we would remark that we are aware that, first, the decomposition of fatty bodies by water under the influence of heat and of pressure is a well-known scientific fact. "Water is substituted for the organic basis. It forms a perfect and defined combination with the fatty acids, while the glycerine is dissolved in the excess of water;" secondly, that as this chemical action takes place under the influence of a weak affinity it is necessary, in addition to the above-named physical and chemical conditions, to insure a perfect molecular agitation of the whole mass, and that we wish it to be understood that what we wish to claim and establish as of our invention consists of an apparatus wherein the water and the fatty matters are heated separately in two different boilers. The first boiler is heated by the source of heat, while the second boiler is heated by the first boiler.

In these boilers the agitation necessary for the chemical action and combination is produced by the pressure of the heated water in the first boiler. This water circulates continuously from this first boiler to the second boiler and from the second to the first in a continuous and self-acting or automatic manner without interruption.

The distinctive characteristics of our apparatus are that it produces agitation by circulation alone—a continuous and automatic circulation produced by the pressure of the water.

Lastly, our apparatus effects its chemical action in a continuous manner without the aid of any manual or other assistance.

Having described the nature of our invention and the manner in which the same is to be performed, we do not claim the application of superheated water for decomposing fatty bodies, nor the form of the apparatus above described, which may vary somewhat, according to conditions and circumstances; but,

What we claim as our invention is—

Producing a continuous automatic circulation of highly-heated water in a very finely-divided state through the bodies under treatment by means of an apparatus constructed and employed substantially as herein shown and described.

ROBT. A. WRIGHT.
L. J. FOUCHÉ.

Witnesses:
GARDESSAL,
Z. MILLION.